US012632462B2

(12) United States Patent
Glazer et al.

(10) Patent No.: US 12,632,462 B2
(45) Date of Patent: May 19, 2026

(54) SYSTEM AND METHOD FOR GENERATING A USER INTERFACE PORTION FOR DISPLAYING SEARCH RESULTS GROUPED BY VIRTUAL CATEGORIES

(71) Applicant: Walmart Apollo, LLC, Bentonville, AR (US)

(72) Inventors: Lauren Ashley Glazer, Seattle, WA (US); Kaushiki Nag, San Jose, CA (US); Sunny Agarwal, San Jose, CA (US); Atul Kochhar, Bengaluru (IN); Charlotte Alexandrine Passot, Mill Valley, CA (US); Lalitesh Morishetti, San Jose, CA (US); Divya Chaganti, San Jose, CA (US); Priyank Gupta, Duvall, WA (US); Rohit Gyanchand Chatter, Bangalore (IN); Abhay Kumar, Sunnyvale, CA (US); Jonathan Lionel Scott, Charlotte, NC (US); Ashish Ranjan, San Francisco, CA (US); Kannan Achan, Saratoga, CA (US); Pallavi Semwal, Bengaluru (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 19/042,464

(22) Filed: Jan. 31, 2025

(65) Prior Publication Data
US 2025/0245239 A1 Jul. 31, 2025

Related U.S. Application Data

(60) Provisional application No. 63/627,648, filed on Jan. 31, 2024.

(51) Int. Cl.
| | |
|---|---|
| *G06F 16/248* | (2019.01) |
| *G06F 16/2457* | (2019.01) |
| *G06F 16/28* | (2019.01) |

(52) U.S. Cl.
CPC ...... *G06F 16/248* (2019.01); *G06F 16/24578* (2019.01); *G06F 16/287* (2019.01)

(58) Field of Classification Search
CPC . G06F 16/248; G06F 16/24578; G06F 16/287
See application file for complete search history.

(56) References Cited

U.S. PATENT DOCUMENTS

| | | | | |
|---|---|---|---|---|
| 9,619,526 B1 * | 4/2017 | Hoover | ............. | G06Q 30/0623 |
| 2009/0193002 A1 * | 7/2009 | Seamon | ................ | G06F 16/284 |
| | | | | 707/999.102 |

(Continued)

*Primary Examiner* — Apu M Mofiz
*Assistant Examiner* — Oscar Wehovz
(74) *Attorney, Agent, or Firm* — FOLEY & LARDNER LLP

(57) ABSTRACT

A method can be implemented via execution of computing instructions configured to run at a processor and stored at a non-transitory computer-readable media. The method can include: determining one or more virtual categories associated with a search query by a user. The method can also include: classifying one or more search results for the search query into one or more category groups based on the one or more virtual categories. The method can further include: generating a respective user interface portion for each group of the one or more category groups. The method can additionally include: generating a user interface comprising the respective user interface portion for each group of the one or more category groups. The method can also include: transmitting, via a computer network, instructions to display the user interface on a user device for the user. Other embodiments are disclosed.

20 Claims, 5 Drawing Sheets

(56) References Cited

U.S. PATENT DOCUMENTS

2016/0350321 A1* 12/2016 Garg ..................... G06F 16/951
2022/0100806 A1*  3/2022 Ahmadvand ......... G06F 40/205
2025/0103588 A1*  3/2025 Song ..................... G06F 16/285

* cited by examiner

300

320 – Back-End System

330 – User Device(s)

350 – Database(s)

340 – Computer Network

310 – System

3110 – Category Generating Model

31110 – Large Language Model

3120 – Front-End Model

3130 – Group Classifying Model

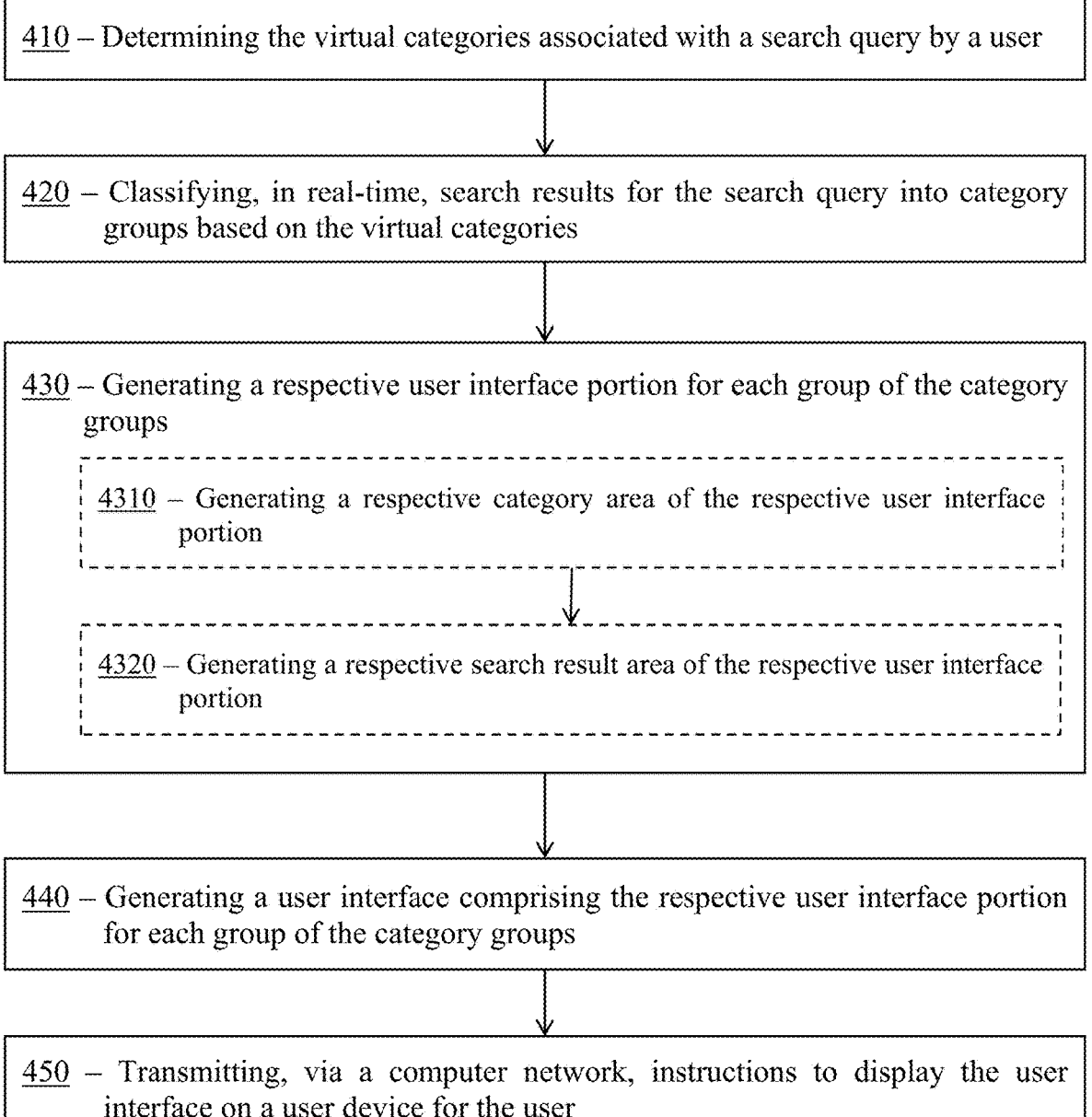

400

410 – Determining the virtual categories associated with a search query by a user 420 – Classifying, in real-time, search results for the search query into category groups based on the virtual categories 430 – Generating a respective user interface portion for each group of the category groups 4310 – Generating a respective category area of the respective user interface portion 4320 – Generating a respective search result area of the respective user interface portion 440 – Generating a user interface comprising the respective user interface portion for each group of the category groups 450 – Transmitting, via a computer network, instructions to display the user interface on a user device for the user

FIG. 4

SYSTEM AND METHOD FOR GENERATING A USER INTERFACE PORTION FOR DISPLAYING SEARCH RESULTS GROUPED BY VIRTUAL CATEGORIES

CROSS-REFERENCE TO RELATED APPLICATIONS

This application claims priority to and the benefit of U.S. Provisional Patent Application No. 63/627,648, filed Jan. 31, 2024, which is incorporated herein by reference in its entirety.

FIELD OF THE DISCLOSURE

The present disclosure generally relates to classifying and displaying search results.

BACKGROUND

The volume of information accessible on the internet has grown exponentially, and search engines are important tools for a user to navigate this vast amount of information. In response to a user's search query, a traditional search engine often returns a long list of search results that can overwhelm the user and be difficult for the user to navigate because the search results are often disorganized. Thus, a solution to this problem is desired.

BRIEF DESCRIPTION OF THE DRAWINGS

The figures described below depict various aspects of the systems, methods, and non-transitory computer readable storage media disclosed therein. It should be understood that each figure depicts an embodiment of a particular aspect of the disclosed systems, methods, and non-transitory computer readable storage media, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 4 illustrates a flow chart for a method for displaying search results grouped by virtual categories, according to one embodiment.

Figure 1:
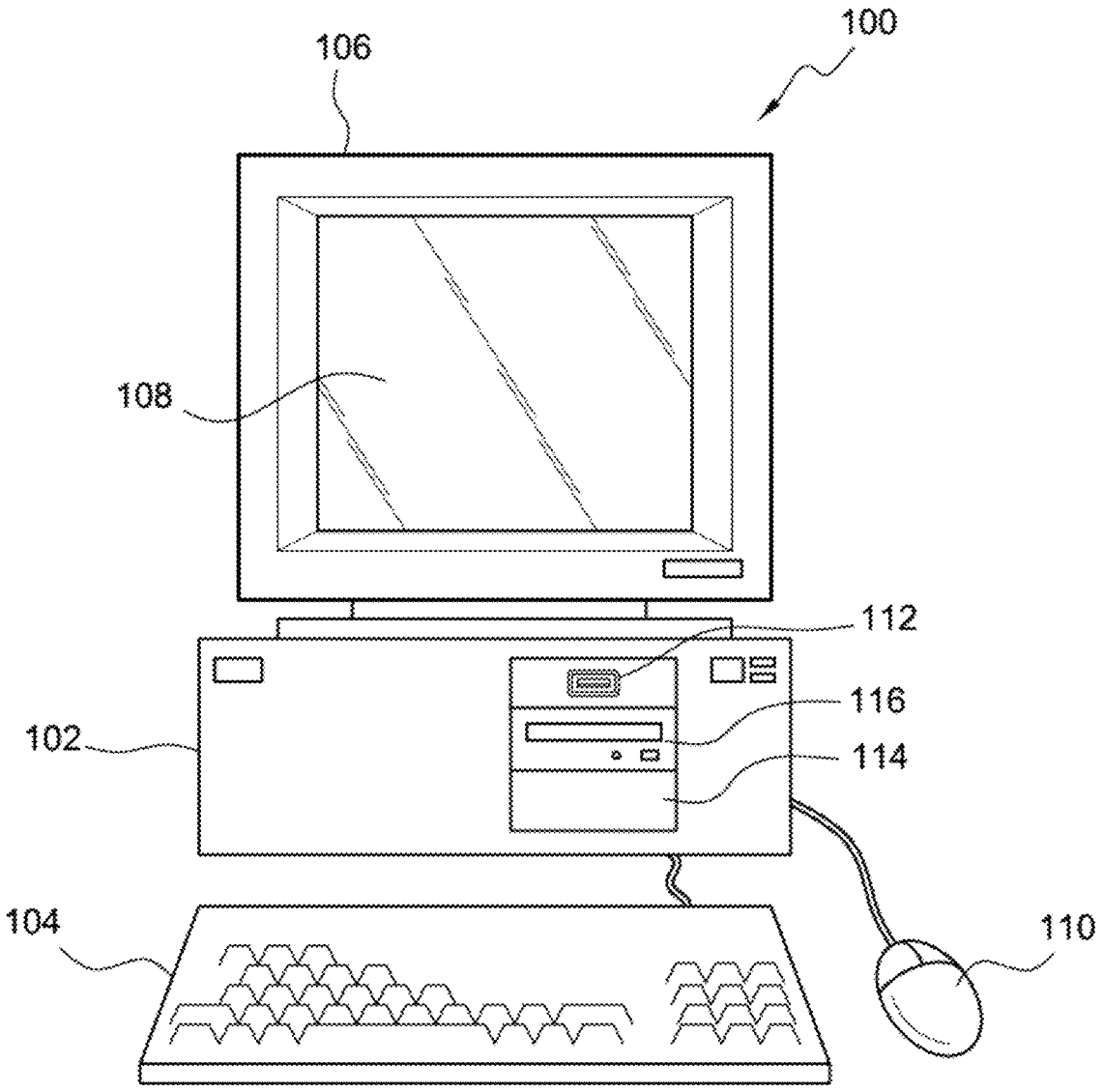
FIG. 1 illustrates a front elevation view of a computer system that are suitable for implementing at least a portion of an embodiment of the system disclosed in FIG. 3.

The figures depict embodiments for purposes of illustration only. One skilled in the art will readily recognize from the following discussion that alternative embodiments of the systems and methods illustrated herein can be employed without departing from the principles of the technology described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DETAILED DESCRIPTION

Figure 2:
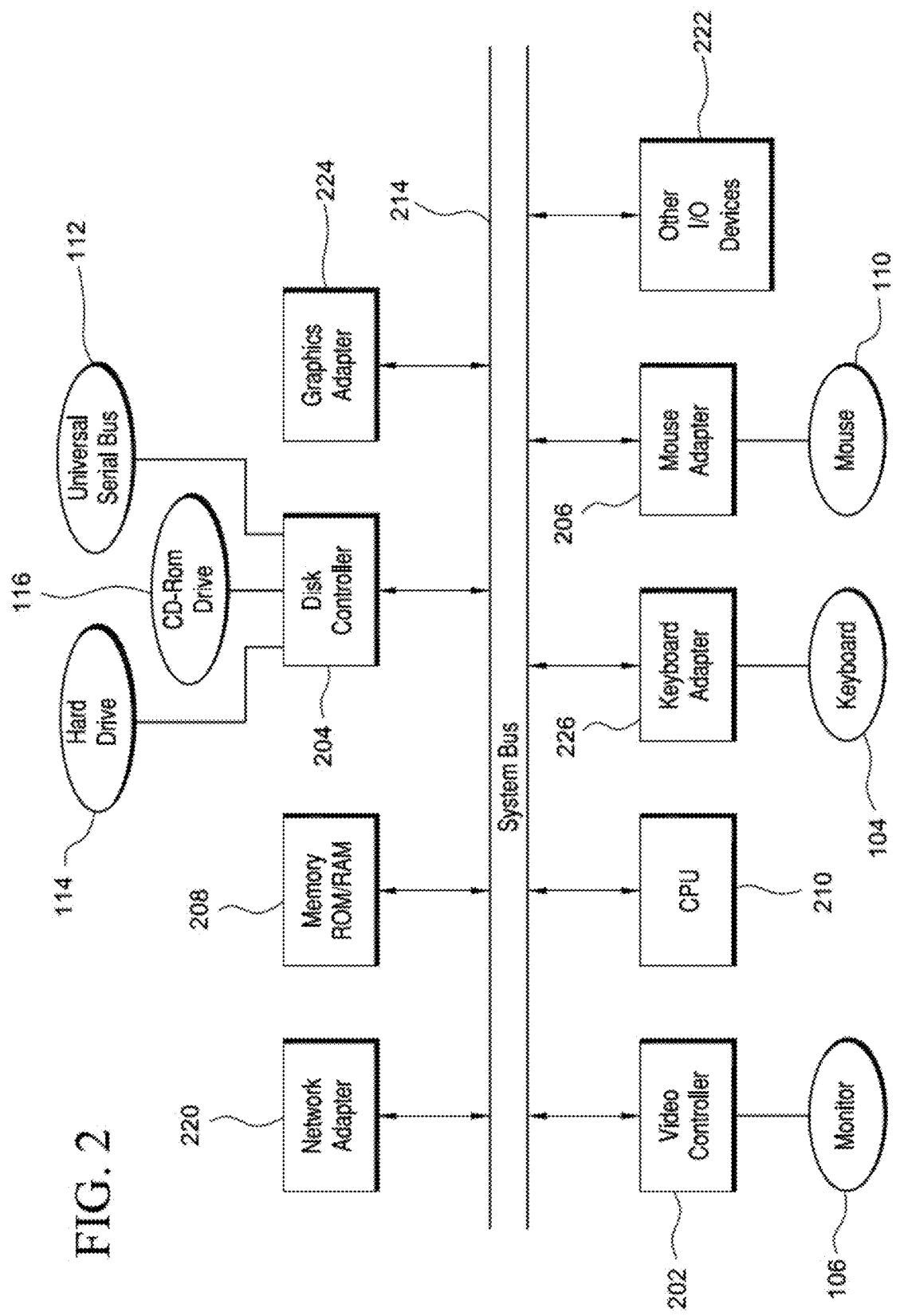
FIG. 2 illustrates a representative block diagram of an example of elements included in circuit boards inside the chassis of the computer system of FIG. 1.

Turning to the drawings, FIG. 1 illustrates an embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Operating systems can includes one or more of the following: (i) Microsoft® Windows® operating system (OS) by Microsoft Corp. of Redmond, Washington, United States of America, (ii) Mac®

OS X by Apple Inc. of Cupertino, California, United States of America, (iii) UNIX® OS, and (iv) Linux® OS. Further operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
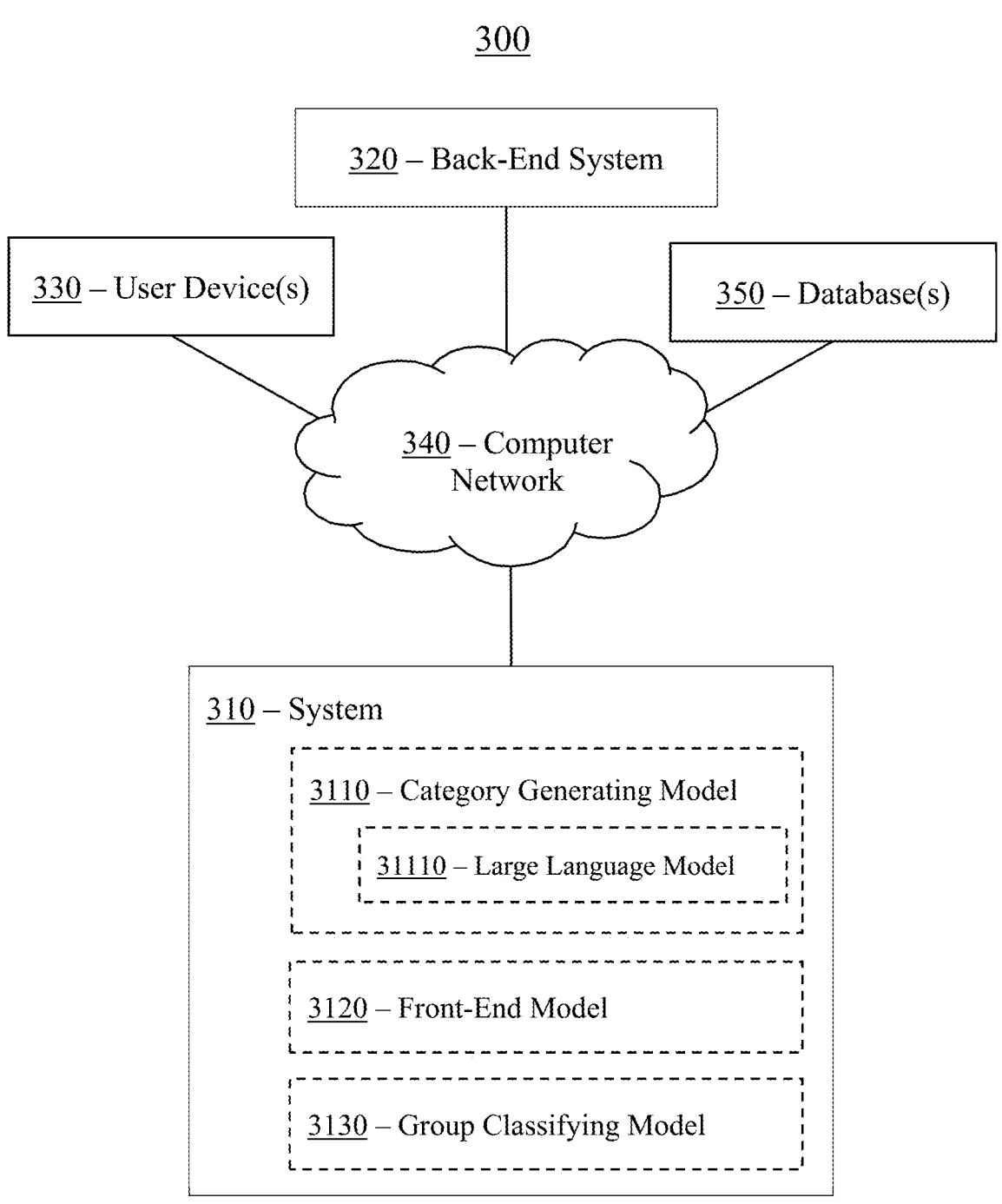
FIG. 3 illustrates a block diagram of a system for displaying search results grouped by virtual categories, according to one embodiment.

Turning ahead in the drawings, FIG. 3 illustrates a block diagram of a system 300 that can be employed for generating a user interface portion for displaying search results grouped by virtual categories, according to an embodiment. In various embodiments, the search results can be associated with a search query for products of a retailer or books in a library, for example. Further, a search query can be keyword-based or natural-language-based. The search query can include text, image, audio, and/or video inputs.

Embodiments of the system 300 are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, operators and/or administrators of system 300 can manage system 300, the processor(s) of system 300, and/or the memory storage unit(s) of system 300 using the input device(s) and/or display device(s) of system 300, or portions thereof in each case.

In many embodiments, system 300 can include a system 310, a back-end system 320, a user device(s) 330, and/or a database(s) 350. System 310 further can include one or more elements, modules, models, or systems (e.g., a category generating model 3110, a large language model 31110, a front-end model 3120, a group classifying model 3130, a natural language model, a BERT model, GPT-4 model, Lamda, label propagation, etc.) to perform various procedures, processes, and/or activities of system 300 and/or system 310. Each of category generating model 3110, large language model 31110, front-end model 3120, and/or group classifying model 3130 can include one or more functions, algorithms, modules, models, and/or systems and can be pre-trained or re-trained.

System 310, back-end system 320, user device(s) 330, category generating model 3110, large language model 31110, front-end model 3120, and/or group classifying model 3130 can each be a computer system, such as computer system 100 (FIG. 1), as described above, and can each be a single computer, a single server, or a cluster or collection of computers or servers, or a cloud of computers or servers. In another embodiment, a single computer system can host system 310, back-end system 320, user device(s) 330, category generating model 3110, large language model 31110, front-end model 3120, and/or group classifying model 3130. Additional details regarding system 310, back-end system 320, user device(s) 330, category generating model 3110, large language model 31110, front-end model 3120, and group classifying model 3130 are described herein.

In some embodiments, system 310 can be in data communication with user device(s) 330, using a computer network (e.g., computer network 340), such as the Internet and/or an internal network that is not open to the public. In several embodiments, user device(s) 330 can be used by users, such as users for an online retailer's websites, customers or potential customers for a retailer, and/or a system operator or administrator for system 310. In certain embodiments, the user devices (e.g., user device(s) 330) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device (e.g., smart glasses, smart watches, an augmented-reality (AR) headset, a virtual-reality (VR) headset, etc.), or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with and/or include a database(s) 350. In certain embodiments, database(s) 350 can include a product catalog of a retailer that contains information about products, items, or SKUs (stock keeping units), for example, among other data as described herein. In a few embodiments, database(s) 350 also can include user account information, including, for example, the respective name, shipping address(es), one or more payment methods, billing address(es), and/or historical transactions associated with each user. In some embodiments, database(s) 350 also can include logs of payment activities for orders, including information about items ordered, payment types used, amounts, delivery addresses, return status, for example, among other data as described herein. In another example, database(s) 350 further can include training data (e.g., synthetic and/or historical logs, tags for the synthetic and/or historical logs, feedback provided by users or measured by system 310, etc.) and/or hyper-parameters for training and/or configuring system 310, category generating model 3110, front-end model 3120, large language model 31110, and/or group classifying model 3130, etc.

In a number of embodiments, database(s) 350 can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more data sources, that particular database can be stored on a single memory storage unit or the contents of that particular database can be spread across multiple ones of the memory storage units storing the one or more databases, depending on the size of the particular database and/or the storage capacity of the memory storage units. In similar or different embodiments, the one or more data sources can each be a computer system, such as computer system 100 (FIG. 1), as described above, and can each be a single computer, a single server, or a cluster or collection of computers or servers, or a cloud of computers or servers.

Database(s) 350 can include a structured (e.g., indexed) collection of data and can be managed by any suitable database management systems configured to define, create, query, organize, update, and manage database(s). Database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between system 310, back-end system 320, user device(s) 330, database(s) 350, category generating model 3110, front-end model 3120, and/or large language model 31110 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). PAN protocol(s) can include Bluetooth, Zigbee, Wireless Universal Serial Bus (USB), Z-Wave, etc.; LAN and/or WAN protocol(s) can include Institute of Electrical and Electronic Engineers (IEEE) 802.3 (also known as Ethernet), IEEE 802.11 (also known as WiFi), etc.; and wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further communication hardware can include wireless communication hardware including, for example, one or more radio transceivers, one or more infrared transceivers, etc. Additional communication hardware can include one or more networking components (e.g., modulator-demodulator components, gateway components, etc.).

In a number of embodiments, system 310 and/or front-end model 3120 can host one or more websites and/or mobile application servers that interface with an application (e.g., a mobile application, a web browser, or a chat application) on user device(s) 330 for a user. In many embodiments, back-end system 320 can support back-office applications, including managing orders, inventory, and/or supply, processing payments, managing user accounts, monitoring and analyzing user usage of system 300 or 310, scheduling deliveries, and so forth. In some embodiments, back-end system 320 further can include a search engine for items in a product catalog (e.g., database(s) 350). In a number of embodiments, back-end system 320 further can be in data communication, via computer network 340, with one or more systems or servers of one or more financial institutions (e.g., a bank, a payment processor, etc.) to process the authorizations and/or declines of payment activities of various payment methods (e.g., credit card payments, debit or bank card payments, etc.). In other examples, system 310 can include back-end system 320, and vice versa.

Still referring to FIG. 3, in many embodiments, system 310 can determine, in real-time by category generating model 3110, one or more virtual categories associated with a search query by a user. The search query can be received, via computer network 340, by front-end model 3120 from user device(s) 330. The search query can be associated with one or more product descriptions. In a number of embodiments, system 310, category generating model 3110, and/or large language model 31110 can generate catalog virtual categories based on items from one or more data sources (e.g., one or more product catalogs of one or more retailers stored in a database(s) 350, etc.). The catalog virtual categories can include the one or more virtual categories. In some embodiments, the one or more virtual categories can be stored in and retrieved from database(s) 350.

In some embodiments, the catalog virtual categories further can be associated with a cluster hierarchy that comprises multiple hierarchical levels defined based on granularity and a respective cluster size range for each of the multiple hierarchical levels. In a few embodiments, system 310, category generating model 3110, and/or large language model 31110 can be pre-trained or trained to generate the catalog virtual categories based on synthetic and/or historical search queries and/or one or more attributes of items in product catalogs (e.g., product types, item brands, item descriptions, item images, item prices, etc.), and so forth. In certain embodiments, the cluster hierarchy can be associated with a product type hierarchy, and the catalog virtual categories also can be associated with product types.

In a number of embodiments, category generating model 3110 can determine, in real-time, the one or more virtual categories from the catalog virtual categories based on the search query. In some embodiments, category generating model 3110 further can include a natural language processing (NLP) model (e.g., large language model 31110, a BERT model, a GPT-3 model, a Claude model, a Palm model, etc.) configured to determine the search intent of the user and the context from the search query and/or one or more prior search queries. The one or more virtual categories can be determined based at least in part on the search intent and/or context. For example, system 310 can determine that the one or more virtual categories for a search query of "TV" include "OLED TVs," "QLED TVs," "LED TVs," "Smart TVs," "4K Ultra HD TVs," and so forth. In another example, the one or more virtual categories for a search query of "educational toys for kids" can include "Puzzles," "Building blocks," "STEM kits," "Board games," etc.

In many embodiments, system 310 further can classify, in real-time, one or more search results for the search query into one or more category groups based on the one or more virtual categories. The search results can be determined by and received, via computer network 340, from a search engine of back-end system 320. In some embodiments, each of the one or more category groups can be associated with a respective category of the one or more virtual categories and can include one or more respective group search results of the one or more search results. The one or more respective group search results of a category group can be sorted based on a respective relevance score between each of the one or more respective group search results and the search query.

In a number of embodiments, system 310 and/or group classifying model 3130 can classify the one or more search results for the search query into one or more category groups by any suitable clustering techniques or models (e.g., meta-path-based weighted random walk, Louvain community detection, K-means clustering, graph-based clustering, etc.). For example, when not all of the one or more search results are associated with a predefined category, and when the one or more virtual categories comprise or are associated with one or more product types, group classifying model 3130 can determine a respective group of the one or more category groups for each ungrouped search result of the one or more search results based on a respective product type of the each ungrouped search result.

In several embodiments, group classifying model 3130 further can determine the respective group for the each ungrouped search result based on a category-item-tag graph. The category-item-tag graph can include nodes and edges between nodes. In a number of embodiments, the nodes can include: (a) one or more virtual category nodes comprising the one or more virtual categories; (b) one or more item nodes comprising the one or more search results; and/or (c) one or more tag nodes associated with attributes of the one or more item nodes or virtual category nodes. The edges can include: (a) one or more category-to-category edges; (b) one or more item-to-category edges; (c) one or more item-to-item edges; (d) one or more item-to-tag edges; and/or (e) one or more category-to-tag edges. In some embodiments, some edges can be generated or modified in real-time by system 310, category generating model 3110, and/or large language model 31110. For example, when a search query includes or implies an association (positive or negative) between a tag and an item node, the item-to-tag edge can be created or modified accordingly, temporarily or permanently.

In embodiments with the category-item-tag graph above, each item-to-category edge of the one or more item-to-category edges can include a respective item relevance score between an associated item of the one or more items to an associated category of the one or more virtual category nodes. The respective item relevance score for each item-to-category edge of the one or more item-to-category edges can be determined, by system 310, category generating model 3110, and/or large language model 31110, based at least in part on the search query.

In similar or different embodiments, each item-to-item edge of the one or more item-to-item edges can include a respective similarity score between a first associated item and a second associated item of the one or more items. The respective similarity score for each item-to-item edge of the one or more item-to-item edges can be determined, by system 310, category generating model 3110, and/or large language model 31110, based on respective item titles for the first associated item and the second associated item in a vocabulary. Each item-to-tag edge of the one or more item-to-tag edges can include a respective tag relevance score. The respective tag relevance score for each item-to-tag edge of the one or more item-to-tag edges can be determined based on: (a) a respective default tag score (e.g., a default score assigned to an internal or known tag manually or automatically by system 310, category generating model 3110, and/or large language model 31110), or (b) a derived score generated, by system 310, category generating model 3110, and/or large language model 31110, based at least in part on the search query.

In a few embodiments, group classifying model 3130 further can adopt a label propagation algorithm and cluster the one or more search results by label propagation based on one or more respective attributes (e.g., product types, item brands, item descriptions, item review scores, etc.) of the one or more search results. A label propagation algorithm can be configured to perform community detection and identify clusters of similar search results by examining the graph structure of the category-item-tag graph and dynamically grouping nodes based on the propagation of labels (e.g., virtual categories).

In embodiments with the category-item-tag graph, group classifying model 3130 further can determine the respective group for the each ungrouped search result based on one or more of: (a) a respective relevance score, or (b) a respective shortest path in the category-item-tag graph. The respective relevance score can include the respective item relevance score for an existing item-to-category edge between the each ungrouped search result and the respective group, and when there are multiple item-to-category edges connected to the each ungrouped search results, the each ungrouped search results is assigned to the group at the other end of the item-to-category edge with the highest score.

In a number of embodiments, to determine the respective group for the each ungrouped search result based on the respective shortest path, group classifying model 3130 further can include determining, by a shortest path algorithm, the respective shortest path between the respective group and the each ungrouped search result in the category-item-tag graph. The respective shortest path can include one or more edges of one or more of: (a) the one or more category-to-category edges, (b) the one or more item-to-category edges, (c) the one or more item-to-item edges, or (d) the one or more item-to-tag edges. Examples of the shortest path algorithm can include Dijkstra's algorithm, Bellman-Ford algorithm, Floyd-Warshall algorithm, Many-to-Many Shortest Path algorithm, Johnson's algorithm, etc. In several embodiments, any changes to the category-item-tag graph (e.g., a created or modified edge or a respective relevance score, etc.) in the process of handling a search query can be stored back to one or more virtual category dictionaries in database(s) 350 so that the graph can be gradually improved. In a number of embodiments, changes to the category-item-tag graph can also be reflected in the associated product type dictionaries.

In many embodiments, after classifying the one or more search results into the one or more category groups, system 310 and/or group classifying model 3130 further can perform one or more post-classification procedures, processes, and/or activities to re-arrange the one or more category groups. For example, in some embodiments, system 310 and/or group classifying model 3130 further can re-classify the one or more search results into the one or more category groups to adjust at least one of: a group size or a group density of the one or more category groups based on any suitable set of aggregation algorithms. The combiner function can integrate the results from these algorithms by setting the primary virtual category to algorithm of Categorization with Existing Category Edges, which has the highest precedence. In several embodiments, the one or more category groups can be associated with a group hierarchy similar or identical to the cluster hierarchy and/or the product type hierarchy, and the group hierarchy can include multiple group hierarchical levels and group size ranges. In some embodiments, system 310 further can de-duplicates the search results, discard any insufficiently sized clusters, and/or update the primary virtual category dictionary and product type dictionary stored in database(s) 350, etc.

In certain embodiments, the one or more category groups, as classified, can be associated with a default group hierarchical level (e.g., the second level from the top/root, etc.). If a group size of the one or more category groups (e.g., an average group size or a respective group size of any of the one or more category groups, etc.) or a group density of the one or more category groups (e.g., an average search result count per category group or a respective search result count of any of the one or more category groups, etc.) is unacceptable (e.g., based on a predetermined cluster size range, a predetermined group size upper threshold, a predetermined group size lower threshold, etc.), system 310 and/or group classifying model 3130 further can change the group hierarchical level (e.g., leveling up or down) for some or all of the one or more category groups. For example, when first-level virtual categories include "TV," second-level virtual categories under "TV" include "OLED TVs," and third-level virtual categories under "OLED TVs" include "65-inch OLED TVs," "52-inch OLED TVs," "4K OLED TVs," and "8K OLED TVs," etc. If the default group hierarchical level is 2, and if the group size or group of the category group for "OLED TVs" is greater than a predetermined threshold (e.g., 20 per category group), group classifying model 3130 can re-classify the search results in this category group or all of the one or more category groups by leveling down (e.g., splitting the search results in a group at a level (e.g., "OLED TVs") into multiple sub-groups at the next level (e.g., "65-inch OLED TVs" and "4K OLED TVs," etc.)).

In some embodiments, group classifying model 3130 additionally can combine two or more small category groups of the one or more category groups at the group hierarchical level based on a respective group size of the two or more small category groups and a cluster size range (or a group size upper and lower thresholds at the group hierarchical level, etc.) for the group hierarchical level. Group classifying model 3130 can determine the two or more small category groups to be combined further based on a similarity score between the two or more small category groups and/or one or more cluster capacity constraints (e.g., upper size limits, lower size limits, etc.).

In a number of embodiments, group classifying model 3130 further can de-duplicate across the one or more category groups. For example, group classifying model 3130 can de-duplicate across the one or more category groups by determining a duplicate item (e.g., an identical or nearly identical item) of the one or more category groups to be removed from a category group based at least in part on one or more of: one or more images, a text, or one or more variants or attributes for the duplicate item. In a few embodiments, group classifying model 3130 can determine the duplicate item to be removed and/or increase diversity by any suitable algorithms (e.g., a union-find (disjoint-set-union) algorithm, Maximal Marginal Relevance, etc.).

In many embodiments, after the one or more search results are classified into the one or more category groups, system 310 further can generate, in real-time, a respective user interface portion for each group of the one or more category groups. For the respective user interface portion, system 310 can generate: (a) a respective category area of the respective user interface portion configured to display one or more respective category indications (e.g., a representative image or text for each respective category indication), and (b) a respective search result area of the respective user interface portion configured to display the one or more respective group search results of the each group. In a number of embodiments, each of the one or more respective category indications can be associated with a respective category of the one or more virtual categories, and a current category indication of the one or more respective category indications can be associated with the each group and highlighted (e.g., having a different background or text color, a bolded text, etc.). In several embodiments, the one or more respective group search results can be sorted based on a respective relevance score between each of the one or more respective group search results and the search query.

In many embodiments, system 310 further can generate a user interface comprising the respective user interface portion for each group of the one or more category groups. The respective user interface portion for each group of the one or more category groups can be arranged in any suitable configurations. For example, the user interface can be configured to display the one or more respective group search results of the each group in a sequence (horizontally or vertically) or in a grid for the one or more category groups. In a number of embodiments, system 310 additionally can transmit, via computer network (e.g., computer network 340), instructions to display the user interface on a user device (e.g., user device(s) 330) for the user.

In a number of embodiments, the user interface, as generated, further can include one or more input controls. The one or more input controls can be configured to refine the search and/or filter or sort the one or more search results. In certain embodiments, the one or more respective category indications displayed in the respective category area of the respective user interface portion for a group of the one or more category groups can be associated with one or more input controls (e.g., hyperlinks or buttons, etc.) for refining a search by, for example, adding an additional search phrase (e.g., the group title) in the search query, submitting the revised search query to the search engine of back-end system 320, and re-generating the user interface portion(s) and/or user interface. In embodiments where the one or more input controls are associated with filtering or sorting the one or more search results, the user interface can be configured to: (a) receive the filtering or sorting criteria, and (b) hide the one or more filtered search results of the one or more search results based on the filtering criteria or re-arrange the respective group search results for display based on the sorting criteria.

In some embodiments, the user interface further can be configured to display one or more sponsored items at a sponsored-item area of the user interface based on a respective similarity score or ranking between each sponsored item and the search query and a respective sponsored status of the each sponsored item. In several embodiments, the user interface also can be configured to display one or more top items of the one or more search results at a top-item area of the user interface based on the respective similarity score or ranking of the one or more top items. In certain embodiments, the sponsored-item area and/or the top-item area can be the same or different. For example, the sponsored-item area can be located at the most prominent region of the user interface (e.g., the top portion or the center portion, etc.), the top-item area can be located at the second prominent region of the user interface (e.g., immediately following the sponsored-item area, etc.), and the user interface portions for the one or more category groups can be arranged in sequence based on the sequence of the one or more category groups.

Turning ahead in the drawings, FIG. 4 illustrates a flow chart for a method 400 of generating a user interface portion for displaying search results grouped by virtual categories, according to an embodiment. Method 400 is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) or system 310 (FIG. 3) (including one or more of its elements, modules, models, and/or systems, such as category generating model 3110 (FIG. 3), large language model 31110 (FIG. 3), front-end model 3120 (FIG. 3), and/or group classifying model 3130 (FIG. 3)) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 4, method 400 can include a block 410 of determining one or more virtual categories associated with a search query by a user. Block 410 can be performed by system 300 (FIG. 3), system 310 (FIG. 3), category generating model 3110 (FIG. 3), and/or large language model 31110 (FIG. 3). For example, in some embodiments, large language model 31110 (FIG. 3) can be pre-trained or trained based on a product catalog (e.g., database(s) 350 (FIG. 3)) to determine catalog virtual categories comprising the one or more virtual categories. Block 410 can determine or update the one or more virtual categories in real-time.

In many embodiments. method 400 further can include a block 420 of classifying, in real-time, one or more search results for the search query into category groups based on the one or more virtual categories, as determined in block 410. In a number of embodiments, block 420 can include one or more of: (a) determining a respective group of the one or more category groups for each ungrouped search result of the one or more search results based at least in part on a respective product type of the each ungrouped search result; (b) clustering the one or more search results by label propagation based on one or more respective attributes of the one or more search results; or (c) determining the respective group for the each ungrouped search result based on one or more of: a respective relevance score or a respective shortest path in a category-item-tag graph.

A category-item-tag graph can include: (a) one or more virtual category nodes comprising the one or more virtual categories; (b) one or more item nodes comprising the one or more search results; (c) one or more tag nodes; (d) one or more category-to-category edges; (e) one or more item-to-category edges; (f) one or more item-to-item edges; and (g) one or more item-to-tag edges. In several embodiments, when block 420 includes determining the respective group for the each ungrouped search result based on the respective shortest path, block 420 further can include determining, by a shortest path algorithm, the respective shortest path between the respective group and the each ungrouped search result in the category-item-tag graph. In certain embodiments, the respective shortest path can include one or more edges of one or more of: the one or more item-to-category edges, the one or more item-to-item edges, or the one or more item-to-tag edges.

In a number of embodiments, each item-to-category edge of the one or more item-to-category edges can include a respective item relevance score between an associated item of the one or more items to an associated category of the one or more virtual category nodes determined based at least in part on the search query. In several embodiments, each item-to-item edge of the one or more item-to-item edges can include a respective similarity score between a first associated item and a second associated item of the one or more items, determined based on respective item titles for the first associated item and the second associated item in a vocabulary. In a few embodiments, each item-to-tag edge of the one or more item-to-tag edges can include a respective tag relevance score determined based on a respective default tag score or a derived score generated based at least in part on the search query.

In many embodiments, block 420 further can include one or more procedures, processes and/or activities after classifying the one or more search results to combine or de-duplicate items across category groups. For example, block 420 further can include: (a) use a combiner function configured to integrate the results from a set of aggregation algorithms to determine a primary category group among the category groups that do not meet certain size or density-related criteria; and (b) merge the category groups into the primary category group. In certain embodiments, after using the combiner function to merge the category groups, block 420 further can de-duplicate the search results, discard any category groups of insufficient sizes, and/or update the primary category group's dictionary and/or the associated product type's dictionary with any changes (e.g., block 420 also can include de-duplicating (e.g., via union-find algorithm) search results across clusters based on one or more of: a respective image, a respective text, one or more respective attributes or variants of each duplicate search result.

In many embodiments, method 400 further can include a block 430 of generating a respective user interface portion for each group of the category groups. In a number of embodiments, block 430 further can include a block 4310 of generating a respective category area of the respective user interface portion, and a block 4320 of generating a respective search result area of the respective user interface portion. In several embodiments, block 4310 can generate the respective category area of the respective user interface portion to display one or more respective category indications. Each of the one or more respective category indications can be associated with a respective category of the one or more virtual categories, and a current category indication of the one or more respective category indications can be associated with the each group and highlighted so that the current category indication can be distinguished from the remaining of the one or more respective category indications. In a few embodiments, the one or more respective group search results of each group of the one or more category groups, as displayed in the respective search result area, can be sorted based on a respective relevance score between each of the one or more respective group search results and the search query.

In many embodiments, method 400 further can include a block 440 of generating a user interface comprising the respective user interface portion, as generated in block 430, for each group of the category groups. The user interface can be configured to display the one or more respective group search results of each group of the one or more category groups in any suitable configurations (e.g., a sequence, a grid, etc.). Additionally, method 400 can include a block 450 of transmitting, via a computer network (e.g., computer network 340 (FIG. 3)), instructions to display the user interface, as generated in block 440, on a user device (e.g., user device(s) 330 (FIG. 3)) for the user.

Figure 5:
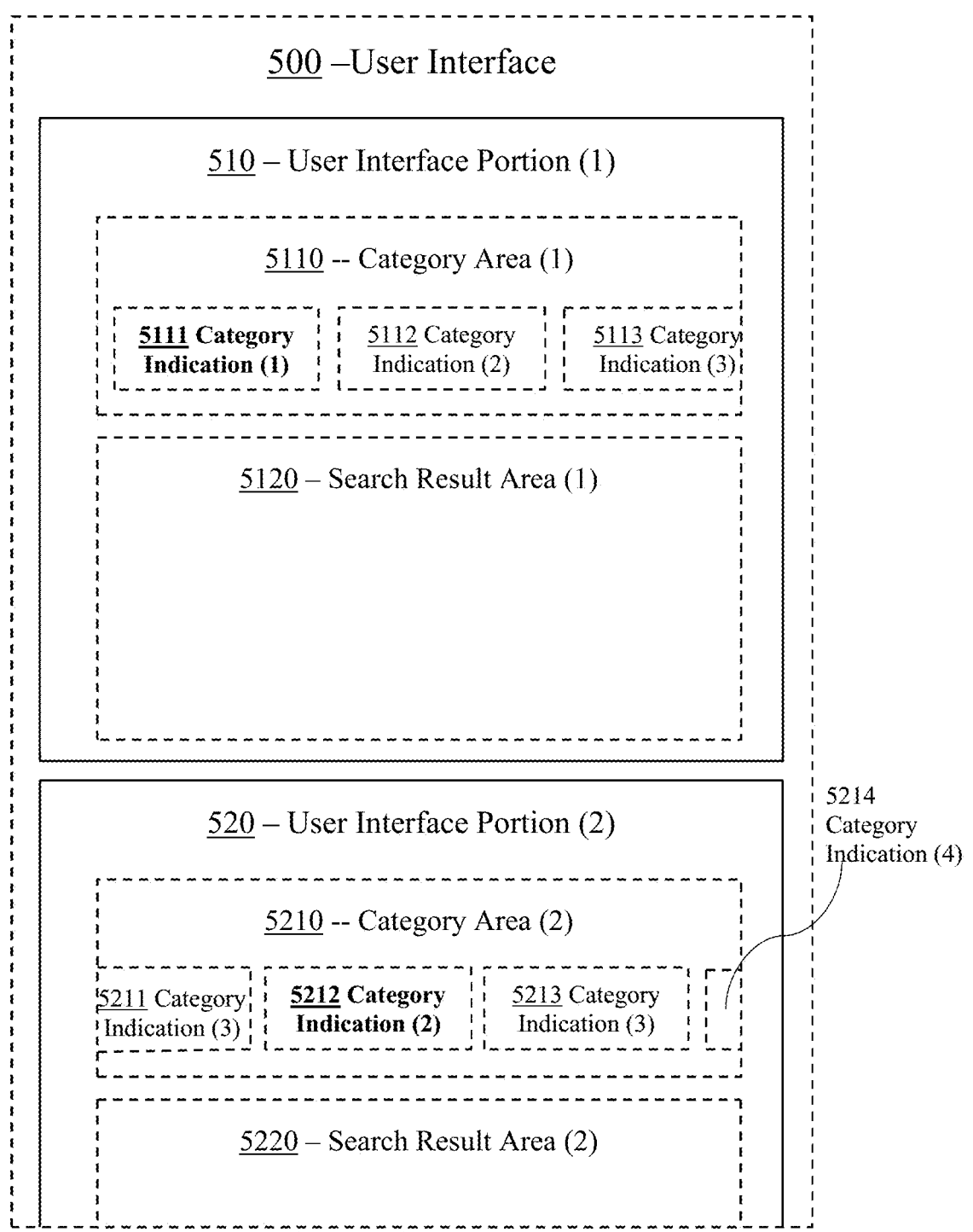
FIG. 5 illustrates a layout of a user interface for displaying search results grouped by virtual categories, according to an embodiment.

Turning ahead in the drawings, FIG. 5 illustrates a layout of a user interface 500 for displaying search results grouped by virtual categories, according to an embodiment. User interface 500 is not limited to the embodiments presented herein. User interface 500 can be employed in many different embodiments or examples not specifically depicted or described herein. In some embodiments, the user interface portions, the areas, and/or the components of user interface 500 can be arranged in the layout presented. In other embodiments, the user interface portions, the areas, and/or the components of user interface 500 can be arranged in any suitable layouts. In still other embodiments, one or more of the user interface portions, the areas, and/or the components of user interface 500 can be combined or omitted. In many embodiments, system 300 (FIG. 3), system 310 (FIG. 3), or method 400 (FIG. 4) can be suitable to generate user interface 500 and/or one or more of the user interface portions, the areas, and/or the components of user interface 500.

Referring to FIG. 5, in a number of embodiments, user interface 500 can include a first user interface portion 510 and a second user interface portion 520 (shown partially), similar or identical to the user interface portions discussed above. First user interface portion 510 can include a category area 5110 and a search result area 5120. Category area 5110 can include category indications 5111 (highlighted) and 5112, and a partial category indication 5113, associated with three category groups of one or more category groups for the search results. Search result area 5120 can be configured to display one or more first group search results of a first category group associated with category indication 5111. Further, second user interface portion 520 can include a category area 5210 and a search result area 5220. Category area 5210 can include category indications 5212 (highlighted) and 5213, and 2 category indications partial 5211 and 5214, associated with four category groups of the one or more category groups for the search results. Search result area 5220 can be configured to display one or more second group search results of a second category group associated with category indication 5212.

Various embodiments can include a system for displaying search results grouped by virtual categories. The system can include one or more processors and one or more non-transitory computer-readable media storing computing instructions that, when run on the one or more processors, cause the one or more processors to perform one or more acts. The one or more acts can include determining, in real-time by a category generating model, one or more virtual categories associated with a search query by a user. The one or more acts further can include classifying, in real-time, one or more search results for the search query into one or more category groups based on the one or more virtual categories. In many embodiments, each of the one or more category groups can be associated with a respective category of the one or more virtual categories and can comprise one or more respective group search results of the one or more search results.

In many embodiments, the one or more acts further can include generating, in real-time, a respective user interface portion for each group of the one or more category groups. The act of generating the respective user interface portion for the each group can include generating a respective category area of the respective user interface portion configured to display one or more respective category indications. In some embodiments, each of the one or more respective category indications can be associated with a respective category of the one or more virtual categories. A current category indication of the one or more respective category indications can be associated with the each group and highlighted. In a number of embodiments, the act of generating the respective user interface portion for the each group further can include generating a respective search result area of the respective user interface portion configured to display the one or more respective group search results of the each group;

In many embodiments, the one or more acts additionally can include generating a user interface comprising the respective user interface portion for each group of the one or more category groups. The user interface can be configured to display the one or more respective group search results of the each group in a sequence for the one or more category groups. In many embodiments, the one or more acts further can include transmitting, via a computer network, instructions to display the user interface on a user device for the user.

In some embodiments, the category generating model can include a large language model trained based at least in part on a product catalog to determine catalog virtual categories comprising the one or more virtual categories. The one or more respective group search results can be sorted based on a respective relevance score between each of the one or more respective group search results and the search query. In several embodiments, classifying the one or more search results for the search query into the one or more category groups comprises one or more of: (a) determining a respective group of the one or more category groups for each ungrouped search result of the one or more search results based on a respective product type of the each ungrouped search result; (b) clustering the one or more search results by label propagation based on one or more respective attributes of the one or more search results; or (c) determining the respective group for the each ungrouped search result based on one or more of: a respective relevance score or a respective shortest path in a category-item-tag graph.

In many embodiments, the category-item-tag graph can include: (a) one or more virtual category nodes comprising the one or more virtual categories; (b) one or more item nodes comprising the one or more search results; (c) one or more tag nodes; (d) one or more category-to-category edges; (e) one or more item-to-category edges; (f) one or more item-to-item edges; and (g) one or more item-to-tag edges.

In a number of embodiments, the act of determining the respective group for the each ungrouped search result based on the respective shortest path further can include determining, by a shortest path algorithm, the respective shortest path between the respective group and the each ungrouped search result in the category-item-tag graph. The respective shortest path can include one or more edges of one or more of: (a) the one or more category-to-category edges, (b) the one or more item-to-category edges, (c) the one or more item-to-item edges, or (d) the one or more item-to-tag edges.

In some embodiments, each item-to-category edge of the one or more item-to-category edges can include a respective item relevance score between an associated item of the one or more items to an associated category of the one or more virtual category nodes. Each item-to-item edge of the one or more item-to-item edges can include a respective similarity score between a first associated item and a second associated item of the one or more items. Moreover, each item-to-tag edge of the one or more item-to-tag edges can include a respective tag relevance score.

In a number of embodiments, the respective item relevance score for each item-to-category edge of the one or more item-to-category edges can be determined based at least in part on the search query. The respective similarity score for each item-to-item edge of the one or more item-to-item edges can be determined based on respective item titles for the first associated item and the second associated item in a vocabulary. The respective tag relevance score for each item-to-tag edge of the one or more item-to-tag edges can be determined based on a respective default tag score or a derived score generated based at least in part on the search query.

In many embodiments, the one or more acts further can include after classifying the one or more search results into the one or more category groups, one or more of: (a) re-classifying the one or more search results into the one or more category groups to adjust at least one of: a group size or a group density of the one or more category groups, by changing a group hierarchical level for the one or more category groups; (b) de-duplicating across the one or more category groups; or (c) combining two or more small category groups of the one or more category groups at the group hierarchical level based on a respective group size of the two or more small category groups and a cluster size range for the group hierarchical level.

In a number of embodiments, a cluster hierarchy can include: (a) multiple hierarchical levels comprising the group hierarchical level; and (b) a respective cluster size range for each of the multiple hierarchical levels. Further, the act of de-duplicating across the one or more category groups can include determining a duplicate item of the one or more category groups to be removed from a category group based at least in part on one or more of: one or more images, a text, or one or more variants for the duplicate item. The act of determining the two or more small category groups to be combined can be further based on a similarity between the two or more small category groups.

Various embodiments further can include a method being implemented via execution of computing instructions configured to run at one or more processors and stored at one or more non-transitory computer-readable media. The method can include the one or more acts of the embodiments described above. For example, the method can include determining, in real-time by a category generating model, one or more virtual categories associated with a search query by a user. The method further can include classifying, in real-time, one or more search results for the search query into one or more category groups based on the one or more virtual categories. Each of the one or more category groups can be associated with a respective category of the one or more virtual categories and can comprise one or more respective group search results of the one or more search results.

In some embodiments, the method further can include generating, in real-time, a respective user interface portion for each group of the one or more category groups. Generating the respective user interface portion for the each group can include generating a respective category area of the respective user interface portion configured to display one or more respective category indications. Each of the one or more respective category indications can be associated with a respective category of the one or more virtual categories. A current category indication of the one or more respective category indications can be associated with the each group and highlighted. Generating the respective user interface portion for the each group further can include generating a respective search result area of the respective user interface portion configured to display the one or more respective group search results of the each group.

In many embodiments, the method further can include generating a user interface comprising the respective user interface portion for each group of the one or more category groups. The user interface can be configured to display the one or more respective group search results of the each group in a sequence for the one or more category groups. In a number of embodiments, the method also can include transmitting, via a computer network, instructions to display the user interface on a user device for the user.

Various embodiments further can include a non-transitory computer-readable medium storing computing instructions that, when executed on a processor, cause the processor to perform certain operations. The operations can include the one or more acts of the embodiments described above. For example, the operations can include determining, in real-time by a category generating model, one or more virtual categories associated with a search query by a user. The operations further can include classifying, in real-time, one or more search results for the search query into one or more category groups based on the one or more virtual categories. Each of the one or more category groups can be associated with a respective category of the one or more virtual categories and can comprise one or more respective group search results of the one or more search results.

In some embodiments, the operations further can include generating, in real-time, a respective user interface portion for each group of the one or more category groups. Generating the respective user interface portion for the each group can include generating a respective category area of the respective user interface portion configured to display one or more respective category indications. Each of the one or more respective category indications can be associated with a respective category of the one or more virtual categories. A current category indication of the one or more respective category indications can be associated with the each group and highlighted. Generating the respective user interface portion for the each group further can include generating a respective search result area of the respective user interface portion configured to display the one or more respective group search results of the each group.

In many embodiments, the operations further can include generating a user interface comprising the respective user interface portion for each group of the one or more category groups. The user interface can be configured to display the one or more respective group search results of the each group in a sequence for the one or more category groups. In a number of embodiments, the operations also can include transmitting, via a computer network, instructions to display the user interface on a user device for the user.

In many embodiments, the techniques described herein can provide a practical application and several technological improvements. In some embodiments, the techniques described herein can provide an improved approach to generate a user interface portion to present search results on a user device (e.g., user device(s) 330 (FIG. 3)). Indeed, the techniques can dynamically classify and cluster search results and generate, in real-time, one or more user interface portions to display the search results in groups based on virtual categories so that the search results, as presented, are aligned with identified search intents.

In a number of embodiments, the techniques described herein can solve a technical problem that arises only within the realm of computer environment, as searching electronic records (e.g., a product catalog stored in database(s) 350 (FIG. 3)) and displaying the search results on a user device (e.g., user device(s) 330 (FIG. 3)) do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Although generating one or more user interface portions to present search results grouped based on virtual categories has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different models, in many different orders. As another example, the modules, models, elements, and/or systems within system 300 or system 310 in FIG. 3 or used in method 400 in FIG. 4 can be interchanged or otherwise modified.

Further, in many embodiments, one or more machine learning models (e.g., category generating model 3110 (FIG. 3), large language model 31110 (FIG. 3), front-end model 3120 (FIG. 3), and/or group classifying model 3130 (FIG. 3), etc.) can be pre-trained or trained to perform one or more of the above-mentioned procedures, processes, activities, and/or methods in system 300 (FIG. 3), system 310 (FIG. 3), and/or method 400 (FIG. 4). Examples of the algorithms used for the machine learning models can include BERT, LLM, Lamda, Palm, XLNet, GPT-3, GPT-4, K-Nearest Neighbors (KNNs), decision trees, linear regression, logistic regression, K-Means, neural networks, fuzzy logic, fully connected feedforward neural network (FNN), convolutional neural networks (CNNs), label propagation, shortest path algorithms, and so forth.

Additionally, in various embodiments, each of the machine learning models used can be trained once or dynamically and/or regularly (e.g., every day, every week, etc.). The training of each of the machine learning models can be supervised, semi-supervised, and/or unsupervised. The training data of training datasets for pre-training or re-training each of the machine learning models can be collected from various data sources, including synthetic training data, or historical input and/or output data by the machine learning model, etc. For example, in a number of embodiments, the input and/or output data of a machine learning model can be curated by a user (e.g., a machine learning engineer, etc.) or automatically collected every time the machine learning model generates new output data to update the training datasets for re-training the machine learning model. In many embodiments, the trained and/or re-trained machine learning model as well as the training datasets can be stored in, updated, and accessed from a database (e.g., database(s) 350 (FIG. 3)).

In some embodiments, the users, systems, and/or methods further can determine whether to add the newly-created historical input and/or output data to the training dataset for retraining the machine learning model(s) based on user or system feedback, predetermined criteria, and/or confidence scores for the historical output data. User or system feedback can be associated with the output data of the machine learning model(s) or the output of the systems and/or methods using the machine learning model(s) (e.g., system 300 (FIG. 3), system 310 (FIG. 3), method 400 (FIG. 4), etc.). Examples of user feedback can include a review score, one or more user actions (e.g., a user's decision to add an item to the online shopping cart, etc.), and so forth. Examples of system feedback can include a phenomenon or an impact on an observed subject (e.g., a computer system 100 (FIG. 1), a website, a server, etc.) observed or measured manually or automatically by system 300 (FIG. 3), system 310 (FIG. 3), method 400 (FIG. 4), etc.

In embodiments where machine learning techniques are not explicitly described in the processes, procedures, activities, and/or methods, such processes, procedures, activities, and/or methods can be read to include machine learning techniques suitable to perform the intended activities (e.g., determining, processing, analyzing, generating, etc.). In a number of embodiments, the one or more machine learning models can be configured to start or stop automatically upon occurrence of predefined events and/or conditions. In certain embodiments, the systems and/or methods can use a pre-trained machine learning model, without any re-training.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

a processor; and a non-transitory computer-readable media storing computing instructions that, when run on the processor, cause the processor to perform:

determining, in real-time by a category generating model, one or more virtual categories associated with a search query by a user;

classifying, in real-time, one or more search results for the search query into one or more category groups based on the one or more virtual categories, wherein each of the one or more category groups is associated with a respective category of the one or more virtual categories and comprises one or more respective group search results of the one or more search results, wherein classifying the one or more search results for the search query into the one or more category groups comprises one or more of:

determining a respective group of the one or more category groups for each ungrouped search result of the one or more search results based on a respective product type of the each ungrouped search result, clustering the one or more search results by label propagation based on one or more respective attributes of the one or more search results, or determining the respective group for the each ungrouped search result based on one or more of: a respective relevance score or a respective shortest path in a category-item-tag graph;

generating, in real-time, a user interface comprising a respective user interface portion for each group of the one or more category groups, comprising:

generating a respective category area, of the respective user interface portion, configured to display one or more respective category indications, wherein:

each of the one or more respective category indications is associated with a respective category of the one or more virtual categories; and a current category indication, of the one or more respective category indications, is associated with the each group and highlighted; and generating a respective search result area, of the respective user interface portion, configured to display the one or more respective group search results of the each group, wherein the user interface is configured to display the one or more respective group search results of the each group in a sequence for the one or more category groups; and transmitting, via a computer network, instructions to display the user interface on a user device for the user.

2. The system of claim 1, wherein:

the category generating model comprises a large language model trained based at least in part on a product catalog to determine catalog virtual categories comprising the one or more virtual categories.

3. The system of claim 1, wherein the one or more respective group search results are sorted based on a respective relevance score between each of the one or more respective group search results and the search query.

4. The system of claim 1, wherein classifying the one or more search results for the search query into the one or more category groups comprises determining the respective group for the each ungrouped search result based on the respective shortest path in the category-item-tag graph, and wherein the category-item-tag graph comprises:

one or more virtual category nodes comprising the one or more virtual categories;

one or more item nodes comprising the one or more search results;

one or more tag nodes;

one or more category-to-category edges;

one or more item-to-category edges;

one or more item-to-item edges; and one or more item-to-tag edges.

5. The system of claim 4, wherein:

determining the respective group for the each ungrouped search result based on the respective shortest path comprises determining, by a shortest path algorithm, the respective shortest path between the respective group and the each ungrouped search result in the category-item-tag graph; and the respective shortest path comprises one or more edges of one or more of: the one or more category-to-category edges, the one or more item-to-category edges, the one or more item-to-item edges, or the one or more item-to-tag edges.

6. The system of claim 4, wherein one or more of:

each item-to-category edge of the one or more item-to-category edges comprises a respective item relevance score between an associated item of the one or more items to an associated category of the one or more virtual category nodes;

each item-to-item edge of the one or more item-to-item edges comprises a respective similarity score between a first associated item and a second associated item of the one or more items; or each item-to-tag edge of the one or more item-to-tag edges comprises a respective tag relevance score.

7. The system of claim 6, wherein one or more of:

the respective item relevance score for each item-to-category edge of the one or more item-to-category edges is determined based at least in part on the search query;

the respective similarity score for each item-to-item edge of the one or more item-to-item edges is determined based on respective item titles for the first associated item and the second associated item in a vocabulary; or the respective tag relevance score for each item-to-tag edge of the one or more item-to-tag edges is determined based on a respective default tag score or a derived score generated based at least in part on the search query.

8. The system of claim 1, wherein the computing instructions, when run on the processor, further cause the processor to perform:

after classifying the one or more search results into the one or more category groups, one or more of:

re-classifying the one or more search results into the one or more category groups to adjust at least one of: a group size or a group density of the one or more category groups, by changing a group hierarchical level for the one or more category groups;

de-duplicating across the one or more category groups; or combining two or more small category groups of the one or more category groups at the group hierarchical level based on a respective group size of the two or more small category groups and a cluster size range for the group hierarchical level.

9. The system of claim 8, wherein one or more of:

a cluster hierarchy comprises:

multiple hierarchical levels comprising the group hierarchical level; and a respective cluster size range for each of the multiple hierarchical levels;

de-duplicating across the one or more category groups comprises determining a duplicate item of the one or more category groups to be removed from a category group based at least in part on one or more of: one or more images, a text, or one or more variants for the duplicate item; or determining the two or more small category groups to be combined is further based on a similarity between the two or more small category groups.

10. A method being implemented via execution of computing instructions configured to run at a processor and stored at a non-transitory computer-readable media, the method comprising:

determining, in real-time by a category generating model, one or more virtual categories associated with a search query by a user;

classifying, in real-time, one or more search results for the search query into one or more category groups based on the one or more virtual categories, wherein each of the one or more category groups is associated with a respective category of the one or more virtual categories and comprises one or more respective group search results of the one or more search results;

after classifying the one or more search results into the one or more category groups, one or more of:

re-classifying the one or more search results into the one or more category groups to adjust at least one of: a group size or a group density of the one or more category groups, by changing a group hierarchical level for the one or more category groups, de-duplicating across the one or more category groups, or combining two or more small category groups of the one or more category groups at the group hierarchical level based on a respective group size of the two or more small category groups and a cluster size range for the group hierarchical level;

generating, in real-time, a user interface comprising a respective user interface portion for each group of the one or more category groups, comprising:

generating a respective category area of the respective user interface portion configured to display one or more respective category indications, wherein:

each of the one or more respective category indications is associated with a respective category of the one or more virtual categories; and a current category indication of the one or more respective category indications is associated with the each group and highlighted; and generating a respective search result area of the respective user interface portion configured to display the one or more respective group search results of the each group, wherein the user interface is configured to display the one or more respective group search results of the each group in a sequence for the one or more category groups; and transmitting, via a computer network, instructions to display the user interface on a user device for the user.

11. The method of claim 10, wherein:

the category generating model comprises a large language model trained based at least in part on a product catalog to determine catalog virtual categories comprising the one or more virtual categories.

12. The method of claim 10, wherein the one or more respective group search results are sorted based on a respective relevance score between each of the one or more respective group search results and the search query.

13. The method of claim 10, wherein classifying the one or more search results for the search query into the one or more category groups comprises one or more of:

determining a respective group of the one or more category groups for each ungrouped search result of the one or more search results based on a respective product type of the each ungrouped search result;

clustering the one or more search results by label propagation based on one or more respective attributes of the one or more search results; or determining the respective group for the each ungrouped search result based on one or more of: a respective relevance score or a respective shortest path in a category-item-tag graph.

14. The method of claim 13, wherein classifying the one or more search results for the search query into the one or more category groups comprises determining the respective group for the each ungrouped search result based on the respective shortest path in the category-item-tag graph, and wherein the category-item-tag graph comprises:

one or more virtual category nodes comprising the one or more virtual categories;

one or more item nodes comprising the one or more search results;

one or more tag nodes;

one or more category-to-category edges;

one or more item-to-category edges;

one or more item-to-item edges; and one or more item-to-tag edges.

15. The method of claim 14, wherein:

determining the respective group for the each ungrouped search result based on the respective shortest path comprises determining, by a shortest path algorithm, the respective shortest path between the respective group and the each ungrouped search result in the category-item-tag graph; and the respective shortest path comprises one or more edges of one or more of: the one or more category-to-category edges, the one or more item-to-category edges, the one or more item-to-item edges, or the one or more item-to-tag edges.

16. The method of claim 14, wherein one or more of:

each item-to-category edge of the one or more item-to-category edges comprises a respective item relevance score between an associated item of the one or more items to an associated category of the one or more virtual category nodes;

each item-to-item edge of the one or more item-to-item edges comprises a respective similarity score between a first associated item and a second associated item of the one or more items;

each item-to-tag edge of the one or more item-to-tag edges comprises a respective tag relevance score;

the respective item relevance score for each item-to-category edge of the one or more item-to-category edges is determined based at least in part on the search query;

the respective similarity score for each item-to-item edge of the one or more item-to-item edges is determined based on respective item titles for the first associated item and the second associated item in a vocabulary; or the respective tag relevance score for each item-to-tag edge of the one or more item-to-tag edges is determined based on a respective default tag score or a derived score generated based at least in part on the search query.

17. The method of claim 10, wherein one or more of:

a cluster hierarchy comprises:

multiple hierarchical levels comprising the group hierarchical level; and a respective cluster size range for each of the multiple hierarchical levels;

de-duplicating across the one or more category groups comprises determining a duplicate item of the one or more category groups to be removed from a category group based at least in part on one or more of: one or more images, a text, or one or more variants for the duplicate item; or determining the two or more small category groups to be combined is further based on a similarity between the two or more small category groups.

18. A non-transitory computer readable storage medium storing computing instructions that, when run on a processor, cause the processor to perform operations comprising:

determining, in real-time by a category generating model comprising a large language model trained based at least in part on a product catalog, one or more virtual categories associated with a search query by a user;

classifying, in real-time, one or more search results for the search query into one or more category groups based on the one or more virtual categories, wherein each of the one or more category groups is associated with a respective category of the one or more virtual categories and comprises one or more respective group search results of the one or more search results, wherein classifying the one or more search results for the search query into the one or more category groups comprises one or more of:

determining a respective group of the one or more category groups for each ungrouped search result of the one or more search results based on a respective product type of the each ungrouped search result, clustering the one or more search results by label propagation based on one or more respective attributes of the one or more search results, or determining the respective group for the each ungrouped search result based on one or more of: a respective relevance score or a respective shortest path in a category-item-tag graph;

generating, in real-time, a respective user interface portion for each group of the one or more category groups, comprising:

generating a respective category area of the respective user interface portion configured to display one or more respective category indications, wherein:

each of the one or more respective category indications is associated with a respective category of the one or more virtual categories; and a current category indication of the one or more respective category indications is associated with the each group and highlighted; and generating a respective search result area of the respective user interface portion configured to display the one or more respective group search results of the each group;

generating a user interface comprising the respective user interface portion for each group of the one or more category groups, wherein the user interface is configured to display the one or more respective group search results of the each group in a sequence for the one or more category groups; and transmitting, via a computer network, instructions to display the user interface on a user device for the user.

19. The non-transitory computer readable storage medium of claim 18, wherein the one or more respective group search results are sorted based on a respective relevance score between each of the one or more respective group search results and the search query.

20. The non-transitory computer readable storage medium of claim 18, wherein the operations further comprise:

after classifying the one or more search results into the one or more category groups, one or more of:

re-classifying the one or more search results into the one or more category groups to adjust at least one of: a group size or a group density of the one or more category groups, by changing a group hierarchical level for the one or more category groups;

de-duplicating across the one or more category groups; or combining two or more small category groups of the one or more category groups at the group hierarchical level based on a respective group size of the two or more small category groups and a cluster size range for the group hierarchical level.

* * * * *